(12) United States Patent
Davis

(10) Patent No.: US 7,502,881 B1
(45) Date of Patent: Mar. 10, 2009

(54) DATA PACKET ROUTING MECHANISM UTILIZING THE TRANSACTION ID TAG FIELD

(75) Inventor: Almir Davis, Quincy, MA (US)

(73) Assignee: EMC Corporation, Hopkinton, MA (US)

( * ) Notice: Subject to any disclaimer, the term of this patent is extended or adjusted under 35 U.S.C. 154(b) by 61 days.

(21) Appl. No.: 11/540,474

(22) Filed: Sep. 29, 2006

(51) Int. Cl.
*G06F 13/00* (2006.01)

(52) U.S. Cl. ................... 710/120; 370/395.31; 370/408; 710/313

(58) Field of Classification Search ................. 710/120, 710/243, 305, 313, 316; 370/396, 397, 398, 370/399, 395.3, 395.31, 400, 402, 408, 412, 370/417, 474, 475
See application file for complete search history.

(56) References Cited

U.S. PATENT DOCUMENTS

| | | | | |
|---|---|---|---|---|
| 5,386,413 | A * | 1/1995 | McAuley et al. | ............. 370/392 |
| 6,778,539 | B1 * | 8/2004 | Rygh | ......................... 370/401 |
| 6,950,428 | B1 * | 9/2005 | Horst et al. | ................. 370/389 |
| 2002/0052972 | A1 * | 5/2002 | Yim | ............................ 709/245 |
| 2002/0080798 | A1 * | 6/2002 | Hariguchi et al. | ...... 370/395.31 |
| 2003/0152092 | A1 * | 8/2003 | Lu | .............................. 370/408 |
| 2005/0146354 | A1 * | 7/2005 | Kundu et al. | .................. 326/41 |
| 2005/0220104 | A1 * | 10/2005 | Tsujikado et al. | ........... 370/390 |

\* cited by examiner

*Primary Examiner*—Glenn A Auve
(74) *Attorney, Agent, or Firm*—Krishnendu Gupta; Scott A. Ouellette

(57) ABSTRACT

A data packet routing mechanism including a plurality of clients for issuing read requests to a host device, the read requests each including a TAG field for identifying which of the plurality of clients issued a particular read request, wherein a completion response corresponding to the particular read request, including the TAG field, is issued from the host to the client that sent the read request, the plurality of clients being organized into M groups, each group including a predetermined number of clients; a first level routing device having an input for receiving completion responses from the host and a plurality of outputs for transmitting completion responses; and a plurality of second level routing devices, each being coupled to the plurality of clients in one of the M groups, and having an input for receiving completion responses from the first level routing device and a plurality of outputs, each output for transmitting completion responses to one of the plurality of clients in the group. The TAG field associated with each completion response includes a predetermined number of bitfields, a first bitfield of the TAG field being read by the first level routing device and providing the first level routing device with an identity of the second level routing device to which the completion response is to be transmitted, to which second level routing device the first level routing device transmits the completion response, and a second bitfield of the TAG field being read by the second level router device that receives the completion response from the first level routing device, the second bitfield providing the second level routing device with the identity of the client within the group to which the completion response is to be transmitted, to which the second level routing device transmits the completion response.

17 Claims, 4 Drawing Sheets

| ORR[2] | ORR[1] | ORR[0] | G_ID[1] | G_ID[0] | ID[2] | ID[1] | ID[0] |
|--------|--------|--------|---------|---------|-------|-------|-------|

FIG. 4A

| ORR | | | G_ID | | ID | | |
|---|---|---|---|---|---|---|---|
| 0 | 0 | 1 | 1 | 0 | 0 | 1 | 0 |

FIG. 4B

DATA PACKET ROUTING MECHANISM UTILIZING THE TRANSACTION ID TAG FIELD

FIELD OF THE INVENTION

The present invention is related to a data packet routing mechanism utilizing the transaction ID tag field of the data packet and, more particularly, to a data packet routing mechanism that uses certain bits in the transaction ID field of the data packet to identify, generally and specifically, the client that originated the data packet.

BACKGROUND OF THE INVENTION

The PCI EXPRESS system is the next generation of PCI (Peripheral Component Interconnect), which is a standard interconnection system that enables the transfer of data between a host device 112 and an attached application layer device 114 of a data transfer system 100, FIG. 1. The PCI EXPRESS system protocol is implemented using PCI EXPRESS system core 116. PCI EXPRESS system core 116 is a hardware controller used to identify and resolve the PCI EXPRESS system protocol layers: the physical/mac layer 118, the link layer 120 and the transaction layer 122. The data is delivered through an application layer interface 124 to the attached application layer device 114.

The PCI EXPRESS system protocol is a very fast, bandwidth rich protocol, enabling a variety of applications to be implemented through a PCI EXPRESS system link. Application layer devices 114 can include bandwidth-consuming applications, such as file transfers and multimedia files, latency-sensitive applications, such as real-time video and voice streaming applications, and applications requiring both high bandwidth and low latency, such as video conferencing.

The application layer interface 124 connects the PCI EXPRESS system core 116 to the application layer device 114. The application layer device 114 may be a single, common address/data bus having control signals to insure errorless handshakes between the host 114 and any type of application. For example, the application layer device may be a switch or router connected between the PCI EXPRESS system core 116 and a number of clients that communicate with the host 112. The application layer device in such a case routes incoming packets to the appropriate client (not shown).

The application layer interface 124 is driven by the transaction layer architecture 122 of the PCI EXPRESS system core 116. The transaction layer architecture 122 of the PCI EXPRESS system core 116 typically consists of six FIFO buffers: a non-posted header buffer "NP H" 126, a non-posted data buffer "NP D" 128, a posted header buffer "P H" 130, a posted data buffer "P D" 132, a completion header buffer "C H" 134 and a completion data buffer "C D" 136. The six buffers 126-136 are needed to implement the PCI EXPRESS system reordering rules for three different types of transfers: 1) posted transfers (typically memory write transfers); 2) non-posted transfers (typically memory read transfers); and 3) completion transfers (also called "read response" transfers). The PCI EXPRESS system reordering rules are set by the PCI EXPRESS system Standard and described in the PCI EXPRESS system Base Specification.

One of the PCI EXPRESS system specific mechanisms is TRANSACTION_ID-based routing, which is handled in PCI EXPRESS system Core. The TRANSACTION_ID is a 24-bit wide field embedded into the PCI Express data packet. Its main functionality is to provide a unique identifier for the sender of a data packet. If a data packet transaction sent by a requesting device requires an acknowledgment-type return packet, or completion, the TRANSACTION_ID field of the data packet transaction provides information to route the returning packet to the original requesting device. The TRANSACTION_ID includes a Requester ID field, which includes all necessary information to identify the high-level requesting device, such as a chip within the system, that initiated the data packet and an 8-bit TAG field. The TAG field is provided in order to uniquely identify the specific client within the specific high-level requesting device from which the data packet transaction was issued. For example, the same requesting device can issue more than one transaction within a particular period of time. All issued transactions might require a completion from the receiver. All Requestor IDs for completions received by the same requesting device would look the same except for the unique TAG field. The TAG field is a tool provided by the PCI EXPRESS system protocol in order to distinguish different completion packets coming to the same requesting device with the same bus number and the same function number.

The structure of the TAG field is typically used as a read request counter. A read request counter is basically an 8-bit counter that gets updated each time a read request transfer is sent by a device. For example, the first transfer from a particular device will have the TAG field set to 0, the second transfer will have the field set to 1 and so forth. Once a completion (read response) packet is received by the requesting device, the particular unique TAG will be released for reuse.

Based on this usage of the TAG field, the maximum outstanding number of transactions per device is $2^8=256$ read request transactions. Such a number of outstanding transactions is typically seen as too large, as it might "clog" the system with outstanding unfinished transactions. The PCI EXPRESS system protocol provides the way to limit the TAG field to only 5 bits. In that case the upper most 3 bits are set to 0. Regardless, if the TAG field is used as 5-bit field or 8-bit field by the requesting device, the completing device is required to return the entire TAG field (along with the rest of the TRANSACTION_ID) without any modifications.

Upon receiving the returned TRANSACTION_ID in the form of a completion, the application must read the TAG field and resort to a look-up table in order to determine which client within the requesting device send the read request, based on the number set in the TAG field of the Transaction ID. The reference to the look-up table takes time, which increases the latency of the data transfer system. This method requires a large memory table, which slows down the process, as valuable time is lost on reading the tables. Certain chip technologies might also reject running the chips with desirable frequencies, as the routing tables tend to consume large portions of ASIC routing channels.

SUMMARY OF THE INVENTION

The present invention is directed to a data packet routing mechanism which utilizes the TAG field of the Transaction ID to specifically identify which requesting device, or client, has initiated a read request and therefore, to which client the read response will be sent. By setting a first number of bits of the TAG field to identify to the individual client, a second number of bits to correspond to a group of clients in which the requesting client resides, and a third group of bits to identify the number of read requests issued by the requesting client, when the completion is returned from the PCI EXPRESS system core to the application layer, the completion is routed directly to the requesting client by the application layer based on the contents of the TAG field. Since no look-up tables are needed to identify the requesting client when the completion is returned to the application layer, the data transfer system is able to operate at a lower latency and higher bandwidth than the prior art system.

BRIEF DESCRIPTION OF THE DRAWINGS

These and other features of the invention will become more readily apparent from the following detailed description when read together with the accompanying drawings, in which:

FIGS. 4A and 4B are diagrams showing the TAG field bits utilized in the present invention.

DETAILED DESCRIPTION

Figure 1:
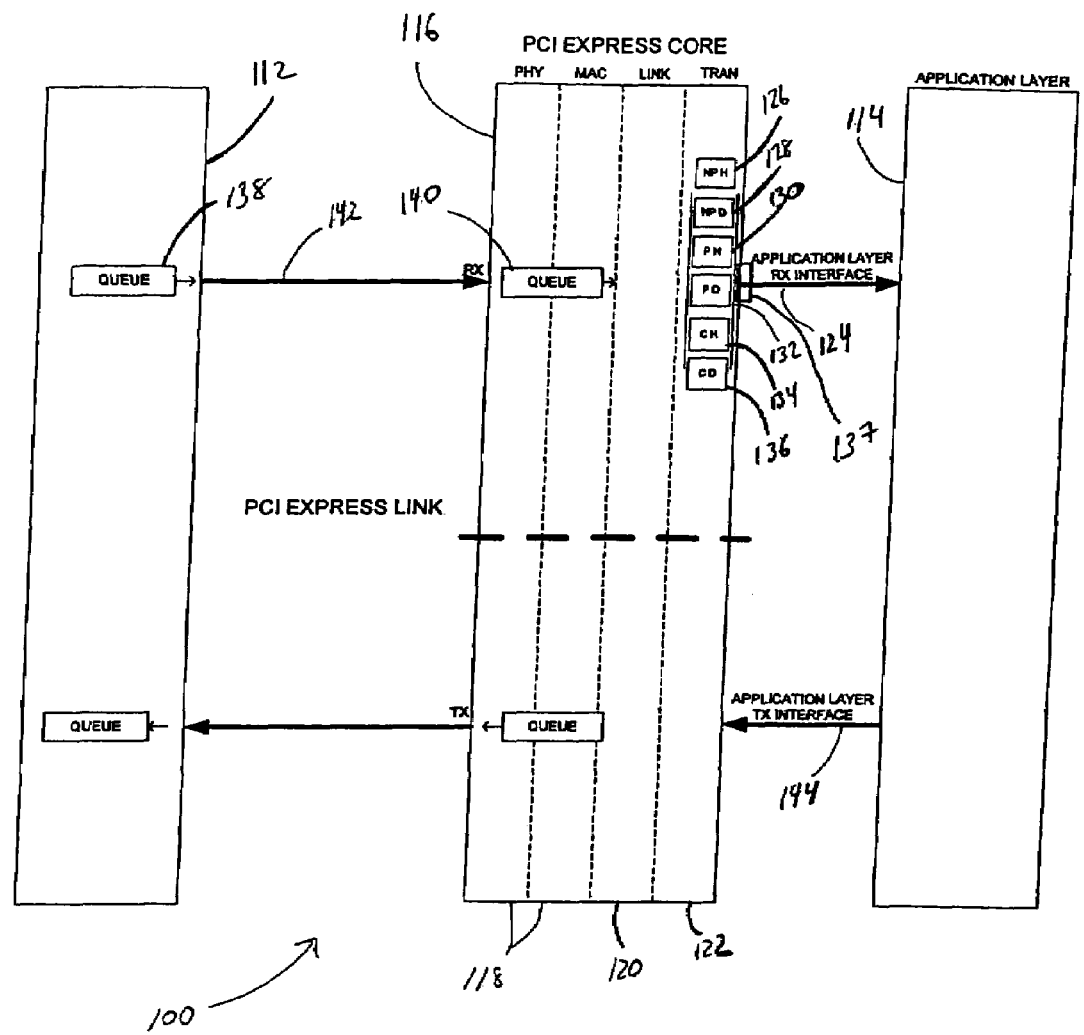
FIG. 1 is a schematic diagram of a PCI EXPRESS system data transfer system.
Figure 2:
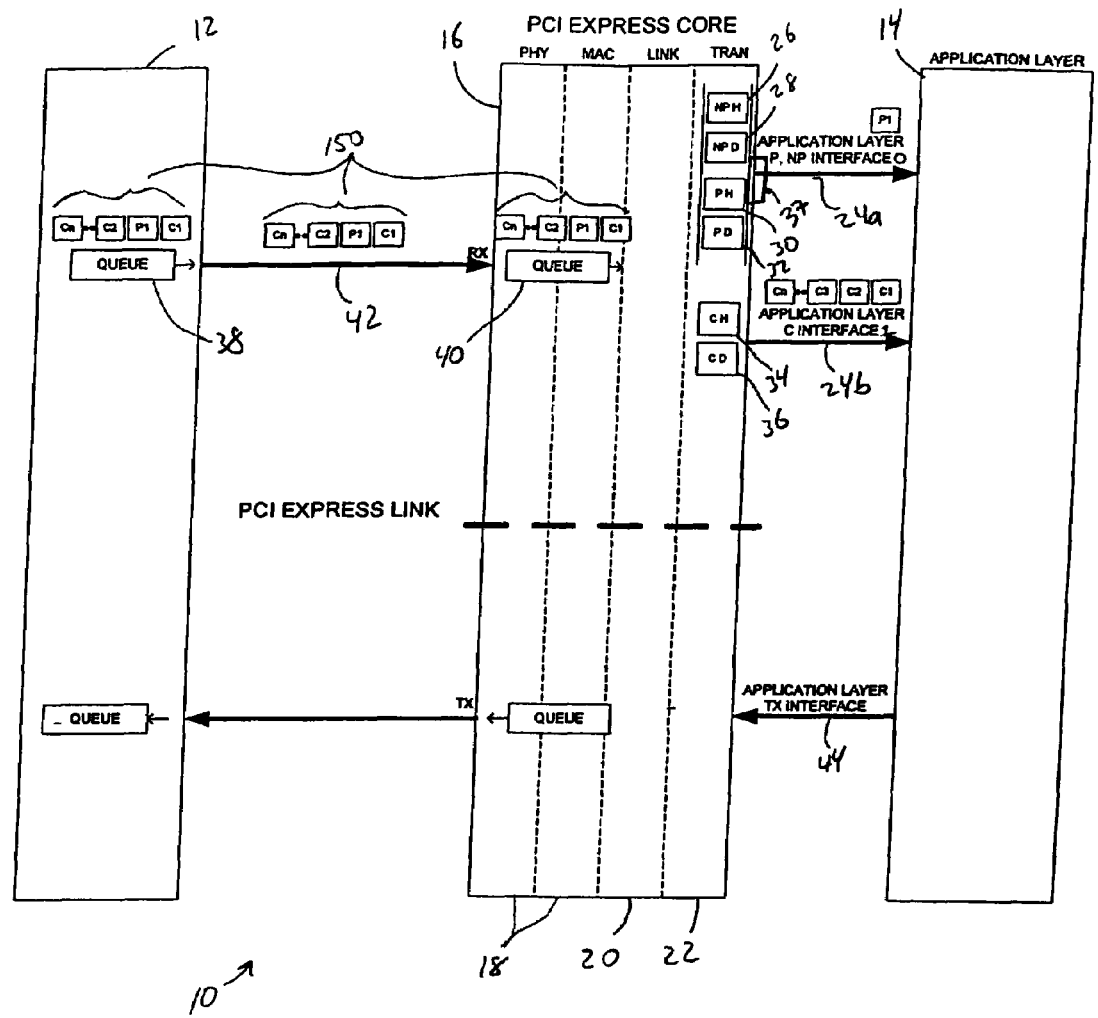
FIG. 2 is a schematic diagram of a PCI EXPRESS system data transfer system having a split application layer interface.

As shown in FIG. 2, which is a schematic diagram of an embodiment of the data transfer system 10 of the present invention, a packet sequence 150: C1, P1, C2, . . . Cn is transmitted from the output queue 38 of the host device 12, across the PCI EXPRESS system link 42 to into the input queue 40 of the PCI EXPRESS system core 16. Each packet of the sequence is then input to its respective transaction layer buffer 26-36, depending on whether the packet is a non-posted data transfer packet, in which case the packet header is input to buffer NP H 26, and the packet data is input to buffer NP D 28; a posted data transfer packet, in which case the packet header is input to buffer P H 30, and the packet data is input to buffer P D 32; or a completion packet, in which case the packet header is input to buffer C H 34, and the packet data is input to buffer C D 36.

The transaction layer 22 includes an arbiter 37 that only handles the posted and non-posted request packets. The posted and non-posted request packets are reordered according to the PCI EXPRESS system Standard and are then transmitted to the application layer device 14 over application layer interface 24a. The completion packets are not arbitrated and may be directly transmitted from the buffers 34, 36 to the application layer device 14 over the application layer interface 24b in the manner described below. As shown in FIG. 2, after each packet of the sequence 150 is input to its respective transaction layer buffer 26-36, the completion packets C1, C2, . . . , Cn may be directly transmitted to the application layer device 14 over application layer interface 24b without arbitration, and the posted request packet P1 is transmitted to the application layer device 14 over application layer interface 24a after arbitration in arbiter 37. Since the posted packet P1 is not reordered behind the completion packets C1, C2, . . . , Cn, it can be relatively contemporaneously transmitted to the application layer 14 with the completion packets.

Figure 3:
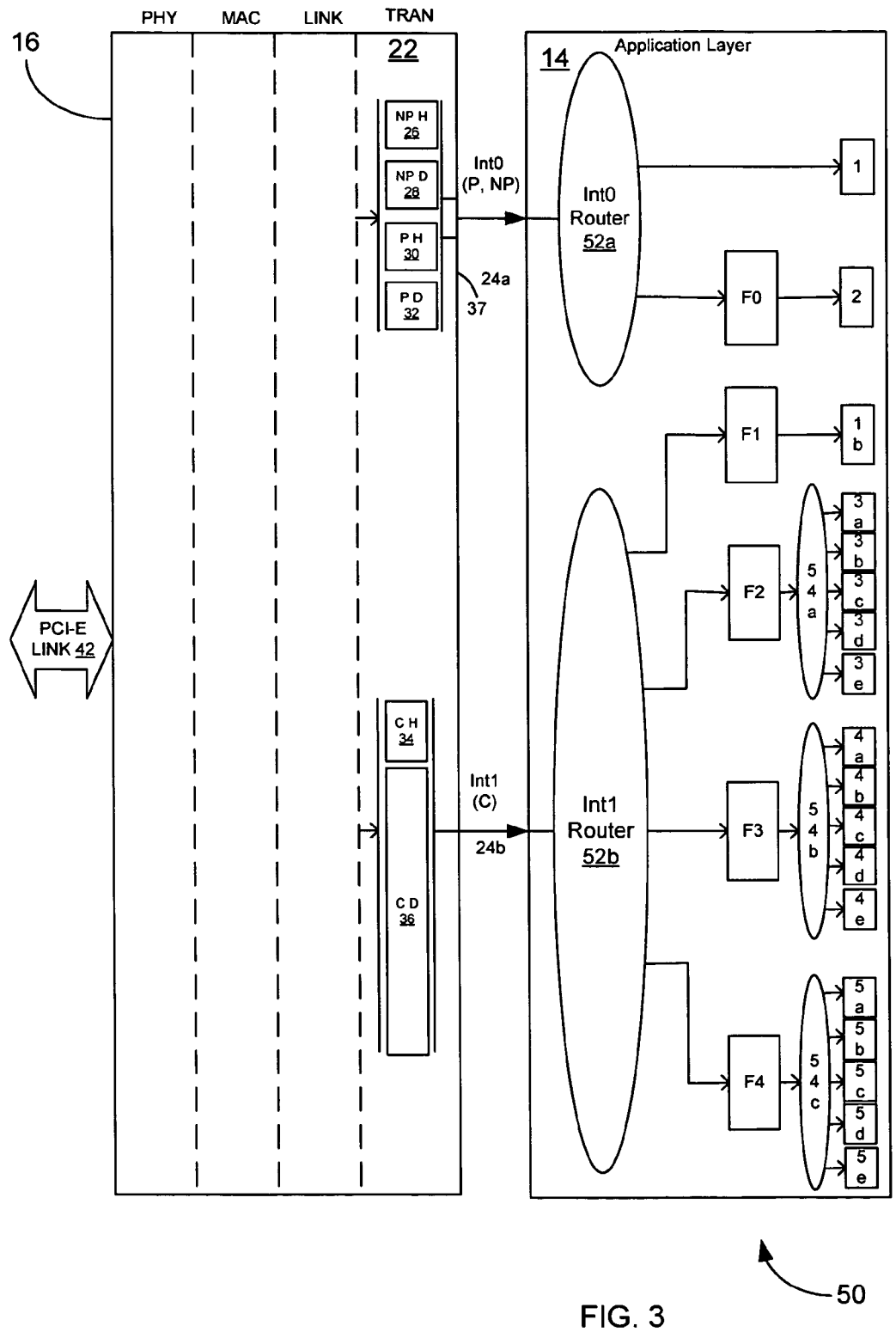
FIG. 3 is a schematic diagram of the data transfer system according to the present invention.

FIG. 3 is a schematic block diagram of the data transfer system 10 showing a more detailed view of the application layer 14. Shown in transaction layer 22 are non-posted buffers 26, 28, posted buffers 30, 32 and completion buffers 34, 36. Shown in application layer 14 is Int0 router 52a, which receives the posted and non-posted transfers from buffers 26, 28, 30, and 32 and transfers them to clients to which they are addressed. Clients 1 and 2 then carry out various functions with the received data transfers. Data packets transferred to client 2 are received through cut-through FIFO F0.

Int1 router 52b receives the completion transfers from buffers 34 and 36 and transfers them to clients 1b, 3a-3e, 4a-4e and 5a-5e. Client 1b receives its completion transfers through cut-through FIFO F1 directly from router 52b. Group 3 clients 3a-3e receive the completion transfers through cut-through FIFO F2 and router 54a; group 4 clients 4a-4e receive the completion transfers through cut-through FIFO F3 and router 54b; and group 5 clients 5a-5e receive the completion transfers through cut-through FIFO F4 and router 54c. The grouping of clients minimizes internal resources, such as memory FIFOs, and enhances the commonalties between the clients, which enables intelligent, priority-based routing.

In operation, completion transfers are transmitted from the PCI EXPRESS system link 42 to the completion transfer buffers 34 for the completion header and 36 for the completion data. Buffers 34 and 36 are preferably store-and-forward buffers, in which a complete packet is stored in the buffer before it is transmitted out to its destination. While the packet is stored in the buffer, it is checked for errors and, if an error is found, the packet is discarded and resent by the host device 12. In the exemplary system shown in FIG. 3, each completion packet transfer may be transmitted to one of thirteen clients, i.e., client 1b, clients 3a-3e, clients 4a-4e and clients 5a-5e. As described above, client 1b and each set of four clients receives its completion packets through one cut-through FIFO, i.e., FIFO F1, FIFO F2 or FIFO F3. Therefore, completion packet transfers which are addressed to be transmitted to client 3a will be routed through FIFO F2 and then, through router 54a, to client 3a. Likewise, completion packet transfers which are addressed to be transmitted to client 5c will be routed through FIFO F4 and then, through router 54c, to client 5c.

As set forth above, each completion packet transfer includes a TAG field which identifies which of the clients 1b, 3a-3e, 4a-4e or 5a-5e sent the read request to which the completion corresponds. In the accordance with the present invention, in order to more readily identify the client that sent a particular read request when the corresponding completion is returned to the client, the TAG field of the completion data packet is embedded with information that routes the data packet directly to the client without the need for a look-up table.

Specifically, the TAG field includes information that identifies the group in which the requesting client resides, information that identifies the requesting client itself, and information that identifies the particular read request sent by the client. In one embodiment, shown in FIG. 4A, bits 0-2 of the TAG field, bitfield TAG[2:0], i.e., bits ID[0], ID[1] and ID[2], are used to identify the client that initially provided the read request to which the completion that is being routed through the application layer corresponds. Bits 3 and 4 of the TAG field, bitfield TAG[4:3], i.e., bits G_ID[0] and G_ID[1], are used to identify the group to which the client belongs. Bits 5-7 of the TAG field, bitfield TAG[7:5], i.e., bits ORR[2], ORR[1] and ORR[0], are used to identify individual read requests sent by a particular client.

The ORR field (Outstanding Read Request) contains unique information defined by each client separately. In some instances, multiple completion packets may be used to acknowledge a read request, and the ORR bitfield identifies to which request the completion is associated. Furthermore, multiple completion packets acknowledging a particular read request for a client might be interleaved with completion packets acknowledging a different read request for that same client. In such cases, the ORR bitfield is the only way for a client to distinguish which response belongs to which request.

The ORR bitfield may also be utilized as a control counter for clients initiating "one-at-the-time" read requests, wherein a client issues one read request and then waits for the completion packet before sending another read request. Such a client will increment the ORR bitfield each time it issues a read request. The client knows that it has only one outstanding read request at a time, but by comparing the ORR value it can use the counter to check that the arriving completion packet is indeed routed correctly to it. In other words, if a client receives a completion while it does not have a read request outstanding, the system will notify the host that the completion was routed incorrectly.

With reference to FIG. 3, Table 1 shows an embodiment of how each bit in the TAG field corresponds to each of client 1b, clients 3a-3e, clients 4a-4e and clients 5a-5e.

TABLE 1

TAG Field Functionalities

| Bitfields | Description |
| --- | --- |
| TAG[7:5] | ORR (Outstanding Read Request - must be unique for each outstanding Read Request)<br>(Note: if not used, the default value is '000') |
| TAG[4:3] | Group ID (G_ID):<br>00 - client 1b<br>01 - Group of clients: 3a, 3b, 3c, 3d, 3e<br>10 - Group of clients: 4a, 4b, 4c, 4d, 4e<br>11 - Group of clients: 5a, 5b, 5c, 5d, 5e |
| TAG[2:0] | ID within a particular group:<br>000 - client a<br>001 - client b<br>010 - client c<br>011 - client d<br>100 - client e |

In operation, when a completion packet is received by the application layer 14, the router Int1 52b first looks at the Group ID bits of the TAG field, i.e., bitfield TAG[4:3]. Based on the Group ID bitfield, router Int1 52b routes the packet to the proper FIFO where the packet is stored. The FIFOs are usually needed for each group in order to avoid one slow group holding the progress of packet delivery for all other groups. Once the packet found its right group the Group ID bitfield TAG[4:3] is no longer needed and it is discarded. The discard saves memory space in the data storage system. As the completion data packet is read out of the FIFO by the corresponding router 54, the router checks the Client ID bitfield TAG[2:0] in order to find the right client within the group. When the client is identified, the packet is routed to the client along with its unique ORR field and the Client ID is discarded. In the case of a completion data packet being routed to client 1b, only the Group ID bitfield is checked, since, once the router Int1 52b determines, based on the Group ID, that the packet belongs to client 1b, the packet is sent directly to client 1b through FIFO F1.

An example of using a TAG field to identify which of the clients a completion data packet is to be sent will be described with reference to FIG. 4B. When a completion packet having a TAG field 60 is received by Int1 router 52b, the router checks the Group ID field G_ID to determine to which of the groups the associated completion data packet is to be routed. Since the G_ID bitfield includes the bits "10", which indicates group 4, Int1 router 52b forwards the completion data packet to FIFO F3, which serves group 4. Router 54b then checks the Client ID field ID to determine to which of the clients within group 4 the completion data packet is to be routed. Since the ID bitfield includes the bits "010", which indicates client 4c, router 54b forwards the completion data packet to client 4c. The client 4c will then check the ORR field, if necessary, to determine which of its read requests the completion data packet corresponds.

Accordingly, the present invention provides a data packet routing mechanism utilizing the TAG field of the data packet to route completion data packets to the client that initiated the corresponding read request. Since the architecture of the data storage system includes groups of clients to which the completion data packets are to be routed, the system utilizes group IDs and client IDs to route the packets to the initiating clients. A first number of bits of the TAG field are utilized to identify the group within which the client resides, a second number of bits are utilized to identify the particular client within the group, and a third number of bits are utilized to enable the client to identify to which read request the completion data packet corresponds.

The system and method described herein may find applicability in any computing or processing environment. The system and method may be implemented in hardware, software, or a combination of the two. For example, the system and method may be implemented using circuitry, such as one or more of programmable logic (e.g., an ASIC), logic gates, a processor, and a memory.

The system and method may be implemented in computer programs executing on programmable computers that each includes a processor and a storage medium readable by the processor (including volatile and non-volatile memory and/or storage elements). Each such program may be implemented in a high-level procedural or object-oriented programming language to communicate with a computer system and method. However, the programs can be implemented in assembly or machine language. The language may be a compiled or an interpreted language.

Each computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the data framer interface. The system and method also may be implemented as a machine-readable storage medium, configured with a computer program, where, upon execution, instructions in the computer program cause a machine to operate to perform the functions of the system and method described above.

Implementations of the system and method may be used in a variety of applications. Although the system and method is not limited in this respect, the system and method may be implemented with memory devices in microcontrollers, general-purpose microprocessors, digital signal processors (DSPs), reduced instruction-set computing (RISC), and complex instruction-set computing (CISC), among other electronic components.

Implementations of the system and method may also use integrated circuit blocks referred to as main memory, cache memory, or other types of memory that store electronic instructions to be executed by a microprocessor or store data that may be used in arithmetic operations.

The invention may be embodied in other specific forms without departing from the spirit or essential characteristics thereof. For example, the number of bits in the TAG field; the number of clients in the system; the number of clients associated with each group/router 54; the number of groups/routers 54; and the number of clients that are configured to receive completion transfers are arbitrary and therefore, any number or combination of these devices may be utilized with the invention. The number of bits utilized to identify each of the clients, the groups and the outstanding read requests are also arbitrary, and each may be varied according to the number of clients and groups/routers 54 in the data storage system and the number of outstanding read requests allowed by the system. For example, in a data storage system utilizing five groups of four clients, the number of bits in the ID bitfield would be 2 and the number of bits in the G_ID bitfield would be 3. Alternatively, the data storage system could be configured such that each client only submits one read request at a time, i.e., a client will only submit a read request after the completion corresponding to the previous read request is received. In such a case, the ORR bitfield is not necessary, and either the ORR bitfield may be set to "0", or all of the bits in the TAG field may be used solely for identifying the groups/routers 54 and the individual clients.

Furthermore, while the invention is described as applying to the PCI EXPRESS system protocol, it will be understood that the inventive concept of routing completion packets as they are transferred to clients by utilizing a number of bits in a field of a read request may be applied to any data transfer system or protocol in which the ability to route completion packets as they are transferred to clients by utilizing a number of bits in a field of a read request is desired.

The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

The invention claimed is:

1. A data storage system comprising:
a plurality of clients for issuing read requests to a host device, the read requests each including a TAG field for identifying which of the plurality of clients issued a particular read request, wherein a completion response corresponding to the particular read request, including the TAG field, is issued from the host to the client that sent the read request, the plurality of clients being organized into a number M of groups, each group including a predetermined number of clients;
a first level routing device having an input for receiving completion responses from the host and a plurality of outputs for transmitting completion responses; and
a plurality of second level routing devices, each being coupled to the plurality of clients in one of the M groups, and having an input for receiving completion responses from the first level routing device and a plurality of outputs, each output for transmitting completion responses to one of the plurality of clients in the group;
wherein the TAG field associated with each completion response includes a predetermined number of bitfields, a first bitfield of the TAG field being read by the first level routing device and providing the first level routing device with an identity of the second level routing device to which the completion response is to be transmitted, to which second level routing device the first level routing device transmits the completion response, and a second bitfield of the TAG field being read by the second level router device that receives the completion response from the first level routing device, the second bitfield providing the second level routing device with the identity of the client within the group to which the completion response is to be transmitted, to which the second level routing device transmits the completion response;
the system further including a plurality of memory devices, each coupled between one of the plurality of outputs of the first level routing device and the input of one of the plurality of second level routing devices for storing the completion responses output by the first level routing device.

2. The data storage system of claim 1 wherein the TAG field includes a third bitfield being read by the client within the group to which the completion response is transmitted that provides the client with an identity of the particular read request to which the completion response corresponds.

3. The data storage system of claim 2 wherein the third bitfield includes 3 bits to enable the third bitfield to identify up to 8 different read request to which the completion response corresponds.

4. The data storage system of claim 1 wherein the TAG field includes 8 bits.

5. The data storage system of claim 1 wherein the first bitfield includes 2 bits to enable the first bitfield to identify up to 4 different second level devices to which a completion response can be transmitted.

6. The data storage system of claim 1 wherein the second bitfield includes 3 bits to enable the second bitfield to identify up to 8 different clients to which a completion response can be transmitted.

7. The data storage system of claim 1 wherein the plurality of memory devices are FIFO devices.

8. The data storage device of claim 1 further comprising a further client having an input coupled one of the plurality of outputs of the first level routing device for receiving completion responses from the first level routing device, wherein the first bitfield of the TAG field corresponding to a completion response that is to be transmitted to the further client is set to zero, and the second bitfield of the TAG field is set to identify the further client, indicating that the completion response is to be transmitted directly to the further client without passing through any of the second level routing devices.

9. The data storage system of claim 1 wherein the first bitfield includes 2 bits to enable the first bitfield to identify up to 4 different second level devices to which a completion response can be transmitted and the second bitfield includes 3 bits to enable the second bitfield to identify up to 8 different clients to which a completion response can be transmitted.

10. A data packet routing mechanism comprising:
a data packet being transmitted from a host device to one of a plurality of clients, the data packet including a client identification field, which identifies the client to which the data packet is being transmitted, the plurality of clients being organized into a number M of groups, each group including a predetermined number of clients;
wherein the client identification field includes a predetermined number of bitfields, a first bitfield of the client identification field being read by a first level routing device and providing the first level routing device with an identity of one of a plurality of second level routing devices to which the data packet is to be transmitted, to which second level routing device the first level routing device transmits the data packet, and a second bitfield of the client identification field being read by the one second level router device that receives the data packet from the first level routing device, the second bitfield providing the one second level routing device with the identity of a client within a group of clients associated with the one second level routing device to which client the data packet is to be transmitted, to which client the second level routing device transmits the data packet;
the mechanism further including a plurality of memory devices, each coupled between the first level routing device and each of the plurality of second level routing devices for storing the data packet transmitted by the first level routing device.

11. The data packet routing mechanism of claim 10 wherein the client identification field includes a third bitfield being read by the client to which the data packet is transmitted that provides the client with an identity of a client transaction to which the data packet corresponds.

12. The data packet routing mechanism of claim 11 wherein the third bitfield includes 3 bits to enable the third bitfield to identify up to 8 different client transactions to which the data packet corresponds.

13. The data packet routing mechanism of claim 10 wherein the client identification field includes 8 bits.

14. The data packet routing mechanism of claim 10 wherein the first bitfield includes 2 bits to enable the first bitfield to identify up to 4 different second level devices to which a data packet can be transmitted.

15. The data packet routing mechanism of claim 10 wherein the second bitfield includes 3 bits to enable the second bitfield to identify up to 8 different clients to which a data packet can be transmitted.

16. The data packet routing mechanism of claim 10 wherein the first bitfield includes 2 bits to enable the first bitfield to identify up to 4 different second level devices to which a data packet can be transmitted and the second bitfield includes 3 bits to enable the second bitfield to identify up to 8 different clients to which a data packet can be transmitted.

17. A data storage system comprising:
- a plurality of clients for issuing read requests to a host device, the read requests each including a TAG field for identifying which of the plurality of clients issued a particular read request, wherein a completion response corresponding to the particular read request, including the TAG field, is issued from the host to the client that sent the read request, the plurality of clients being organized into a number M of groups, each group including a predetermined number of clients;
- a first level routing device having an input for receiving completion responses from the host and a plurality of outputs for transmitting completion responses; and
- a plurality of second level routing devices, each being coupled to the plurality of clients in one of the M groups, and having an input for receiving completion responses from the first level routing device and a plurality of outputs, each output for transmitting completion responses to one of the plurality of clients in the group;
- wherein the TAG field associated with each completion response includes a predetermined number of bitfields, a first bitfield of the TAG field being read by the first level routing device and providing the first level routing device with an identity of the second level routing device to which the completion response is to be transmitted, to which second level routing device the first level routing device transmits the completion response, and a second bitfield of the TAG field being read by the second level router device that receives the completion response from the first level routing device, the second bitfield providing the second level routing device with the identity of the client within the group to which the completion response is to be transmitted, to which the second level routing device transmits the completion response;
- wherein the TAG field includes a third bitfield being read by the client within the group to which the completion response is transmitted that provides the client with an identity of the particular read request to which the completion response corresponds.

* * * * *